US007107519B1

(12) United States Patent
Webster et al.

(10) Patent No.: US 7,107,519 B1
(45) Date of Patent: Sep. 12, 2006

(54) SPREADSHEET-BASED USER INTERFACE CREATION

(75) Inventors: Steven Webster, Tigard, OR (US); Robb Robles, Wilsonville, OR (US); E. John McGarry, Tigard, OR (US); Russ Weinzimmer, Milford, NH (US)

(73) Assignee: Cognax Corporation, Natick, MA (US)

( * ) Notice: Subject to any disclaimer, the term of this patent is extended or adjusted under 35 U.S.C. 154(b) by 965 days.

(21) Appl. No.: 09/932,119

(22) Filed: Aug. 16, 2001

(51) Int. Cl.
*G06F 17/00* (2006.01)
(52) U.S. Cl. ............... 715/503; 715/504; 715/526
(58) Field of Classification Search ............... 715/503, 715/504, 517, 515, 526, 505; 345/440, 762, 345/866
See application file for complete search history.

(56) References Cited

U.S. PATENT DOCUMENTS

| | | | | |
|---|---|---|---|---|
| 5,255,363 A * | 10/1993 | Seyler | ............... | 715/526 |
| 5,623,591 A * | 4/1997 | Cseri | ............... | 345/762 |
| 5,880,742 A * | 3/1999 | Rao et al. | ............... | 345/440 |
| 5,883,623 A * | 3/1999 | Cseri | ............... | 345/866 |
| 5,983,268 A * | 11/1999 | Freivald et al. | ............... | 709/218 |
| 6,138,130 A * | 10/2000 | Adler et al. | ............... | 715/503 |
| 6,859,907 B1* | 2/2005 | McGarry | ............... | 715/503 |

OTHER PUBLICATIONS

Hasler A. F. et al.; A High Performance Interactive Image Spreadsheet (IISS), Computers in Physics, American Institute of Physics, Woodbury, NY, US, vol. 8, No. 3, May 1, 1994, pp. 325-342.
Piersol K. W., Object Oriented Spreadsheets, The Analytic Spreadsheet Package Oopsla. Object-Oreientated Programming Systems, Languages and Applications. Conference Proceedings, Sep. 1986, pp. 385-390.

Levoy M; Spreadsheets for Images; Computer Graphics Proceedings, Annual Conference Series, Siggraph, Jul. 24, 1994, pp. 139-146.
Nunez F. et al.; Vissh; A Data Visualisation Spreadsheet: Proceedings of the Joint Europgraphics and IEEE TCVG Symposium on Visualization, Data Visualization, May 29, 2000, pp. 209-218.
Brown A: DSP Design with Dadisp Electronics World and Wireless World, Reed Business Publishing, Sutton, Surrey, GB, vol. 95, No. 1646 Dec. 1, 1989, pp. 1151-1154.
Varshney A et al: Finesse: A Financial information Spreadsheet, Information Visualization 96, Proceedings IEEE Symposium on San Francisco, CA, Oct. 28-29, 1996, Los Alamitos, Ca, IEEE Comput. Soc. Oct. 28, 1996, pp. 70-71, 125.

* cited by examiner

*Primary Examiner*—Sanjiv Shah
(74) *Attorney, Agent, or Firm*—Russ Weinzimmer

(57) ABSTRACT

A method is disclosed for creating a user interface for a spreadsheet-based software application. The method includes providing a spreadsheet having a plurality of standard cells displayable as standard spreadsheet cells, and a plurality of user interface cells displayable only as a window superimposed upon the standard spreadsheet cells; and providing at least one control function adapted to create the window superimposed upon the standard spreadsheet cells. Also disclosed is a user interface for a spreadsheet-based software application that includes a spreadsheet having a plurality of standard cells displayable as standard spreadsheet cells; and at least one custom view control function adapted to create a window superimposed upon the standard spreadsheet cells, the window displaying a subset of the standard cells. This invention substantially simplifies the task of programming a user interface using a spreadsheet environment. All standard spreadsheet functionality is available for use in the user interface creation process.

15 Claims, 22 Drawing Sheets

|   | A | B | C | D | E | F | G | ... | Z |
|---|---|---|---|---|---|---|---|-----|---|
| 0 | Image | | | | | | | | |
| 1 | | | | | | | | | |
| 2 | | | | | | | | | |
| 3 | | | | | | | | | |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| ... | | | | | | | | | |
| 399 | | | | | | | | | |
| 400 | | | | | | | | | |
| ... | | | | | | | | | |
| 599 | | | | | | | | | |

FIGURE 20

SPREADSHEET-BASED USER INTERFACE CREATION

COPYRIGHT NOTICE

The disclosure of this patent document contains material that is subject to copyright protection. The copyright owner has no objection to the facsimile reproduction by anyone of the patent document or the patent disclosure, as it appears in the United States Patent and Trademark Office patent file or records, once a patent is issued on this application, but otherwise reserves all copyright rights whatsoever.

FIELD OF THE INVENTION

This invention relates to software user interfaces, and particularly to creation of a user interface using a spreadsheet.

BACKGROUND OF THE INVENTION

Known spreadsheet user interfaces typically expose all or most of the cells that are contained in a spreadsheet. However, for a variety of reasons it is sometimes desirable to restrict users' access to only those cells of the spreadsheet containing formulas that the user needs to verify or change. There are several reasons for this, including: to protect proprietary formulas, to restrict modifications to values contained in selected cells, to allow for positioning of cell content to be grouped according to functionality, and to simplify novice users' view of a spreadsheet.

Existing PC-based spreadsheet software typically does too little to facilitate creation or customization of a user interface, or requires too much of the user to solve this problem. The spreadsheet author can arrange the cells to very carefully expose selected regions of the spreadsheet to the user. The remainder of the spreadsheet (rows and or columns) can then be hidden. But this makes modifying the spreadsheet very tedious. Furthermore, unrelated cells may need to be placed adjacent to each other in the spreadsheet so that they are visible at the same time, which can create a confusing interface. Also, using this approach, it is not possible to guide a person through a step-by-step process to enter data.

Another approach is to utilize a scripting or programming language to construct a form, or template, for entering data by a user. This technique allows for complete control and customization of the interface that the user sees, but it requires the spreadsheet designer or the spreadsheet user to perform actual programming in a language such as Visual Basic or Java. An application developer most likely is not a software programmer. Therefore, coordination with a software developer is needed to create the interface for the spreadsheet.

Another problem with current solutions to custom interface creation is that they are difficult and prone to redesign. A simple addition to a requirement can cause a major rework to the spreadsheet front-end or lay out. Likewise, if a software developer is involved, further coordination is necessary to effect appropriate modifications to the programming code.

SUMMARY OF THE INVENTION

In one general aspect, the invention is a method for creating a user interface for a spreadsheet-based software application. The method includes: providing a spreadsheet having a plurality of standard cells displayable as standard spreadsheet cells, and a plurality of user interface cells displayable only as a window superimposed upon the standard spreadsheet cells; and providing at least one control function adapted to create the window superimposed upon the standard spreadsheet cells. In a preferred embodiment, the at least one control function is executed as a function in a spreadsheet cell. In another preferred embodiment, the user interface cells are executed by the same processor that executes the standard cells.

In another preferred embodiment, the window superimposed upon the standard spreadsheet cells is opaque with respect to the standard spreadsheet cells, such that the standard spreadsheet cells cannot be seen where ever the standard spreadsheet cells are covered by the window. In some preferred embodiments, the window superimposed upon the spreadsheet cells completely covers the spreadsheet cells so as to hide substantially all previously visible features of the standard spreadsheet cells. In other preferred embodiments, at least one wizard function adapted to manage a plurality of control functions is provided. This one wizard function can present the plurality of control functions as a menu wherein each control function can be independently accessed by a user. It is also possible and desirable for the wizard to execute the plurality of control functions in a sequence. In a preferred embodiment, the sequence and functionality of the plurality of control functions are responsive to user input.

Another general aspect of the invention is a method for creating a user interface for a software application, wherein the method includes: providing a spreadsheet having a plurality of user interface cells displayable only as a window superimposed upon the software application; and providing at least one control function cooperative with a user interface cell, the at least one control function being adapted to create the window superimposed upon the software application.

Yet another general aspect of the invention is a user interface for a spreadsheet-based software application, wherein the application includes a spreadsheet having a plurality of standard cells displayable as standard spreadsheet cells. The user interface includes: a plurality of user interface cells displayable only as a window superimposed upon the standard spreadsheet cells; and at least one control function adapted to create the window superimposed upon the standard spreadsheet cells.

In yet another general aspect of the invention, a spreadsheet is claimed that includes a plurality of standard cells displayable as standard spreadsheet cells, and a plurality of user interface cells displayable only as a window superimposed upon the standard spreadsheet cells. In a preferred embodiment, further included is at least one control function adapted to create the window superimposed upon the standard spreadsheet cells.

In still another general aspect of the invention, a computer system includes: a spreadsheet having a plurality of standard cells and a plurality of user interface cells; an application processor for accessing both the plurality of standard cells, and the plurality of user interface cells; and a user interface processor, cooperative with the application processor, for displaying the plurality of standard cells and user interface cells. In a preferred embodiment of this computer system is further included at least one control function adapted to create at least a portion of a user interface for the spreadsheet, the control function being executable by the application processor. Here, the at least one control function can be a dialog function. Also, the at least one control function can be a custom view function.

Another general aspect of the invention is a method for creating a user interface for a spreadsheet-based software application, wherein the method includes: providing a spreadsheet having a plurality of standard cells displayable as standard spreadsheet cells; and providing at least one custom view control function adapted to create a window superimposed upon the standard spreadsheet cells, the window displaying a subset of the standard cells.

In a preferred embodiment, cursor movement is limited to the subset of the standard cells. In another preferred embodiment, grid lines are not displayed. In still another preferred embodiment, no expression line is displayed. Also, no headers can be displayed in another preferred embodiment.

In a further general aspect of the invention, a user interface for a spreadsheet-based software application is claimed. This user interface includes: a spreadsheet having a plurality of standard cells displayable as standard spreadsheet cells; and at least one custom view control function adapted to create a window superimposed upon the standard spreadsheet cells, the window displaying a subset of the standard cells.

In a preferred embodiment, wherein cursor movement is limited to the subset of the standard cells. In another preferred embodiment, grid lines are not displayed. In yet another preferred embodiment, no expression line is displayed. In still another preferred embodiment, no headers are displayed. This aspect of the invention can further include a custom view wizard for managing a collection of custom view control functions. In this aspect of the invention, the custom view wizard can be dynamic at run-time. Also, the custom view wizard can adapt to user input at run-time. It is also possible that the custom view wizard adapts to spreadsheet calculation results.

This invention solves the problem of creating a user interface for a spreadsheet-based application by allowing the spreadsheet application developer to create a user interface including Dialog boxes and Wizards. This interface runs with the spreadsheet to expose only that data which the spreadsheet developer deems necessary to be viewed or modified by the user of the application. In fact, it is even possible to mask that the interface is actually a spreadsheet. Further, this invention considerably decreases the level of effort for interface design and creation in a spreadsheet environment. All standard spreadsheet functionality, cut & paste operations, cell referencing, etc. are inherently available for use in the interface creation process. This invention substantially simplifies the task of programming a user interface.

Consequently, this invention allows the developer, during the development phase, to focus on solving the application problem. The layout and organization of the function and data cells can be arranged for the convenience of the developer and the solution of the problem. The spreadsheet developer can design the spreadsheet layout in the most appropriate fashion and then create a user interface without regard to how the main data cells are arranged.

Once the application functionality is complete, the developer can focus on the user interface required for the application. By inserting a combination of Dialog, Wizard, and Select functions into the spreadsheet, the developer designs an interface for the user. When executed by the spreadsheet engine, or by user interaction, these functions generate the user interface for the application, as explained in detail below.

BRIEF DESCRIPTION OF THE DRAWING

The invention will be more fully understood from the following detailed description, in conjunction with the following figures, wherein:

FIG. 20 schematic representation of ranges of spreadsheet cells as accessed by the VP and UI.

DETAILED DESCRIPTION

Figure 1:
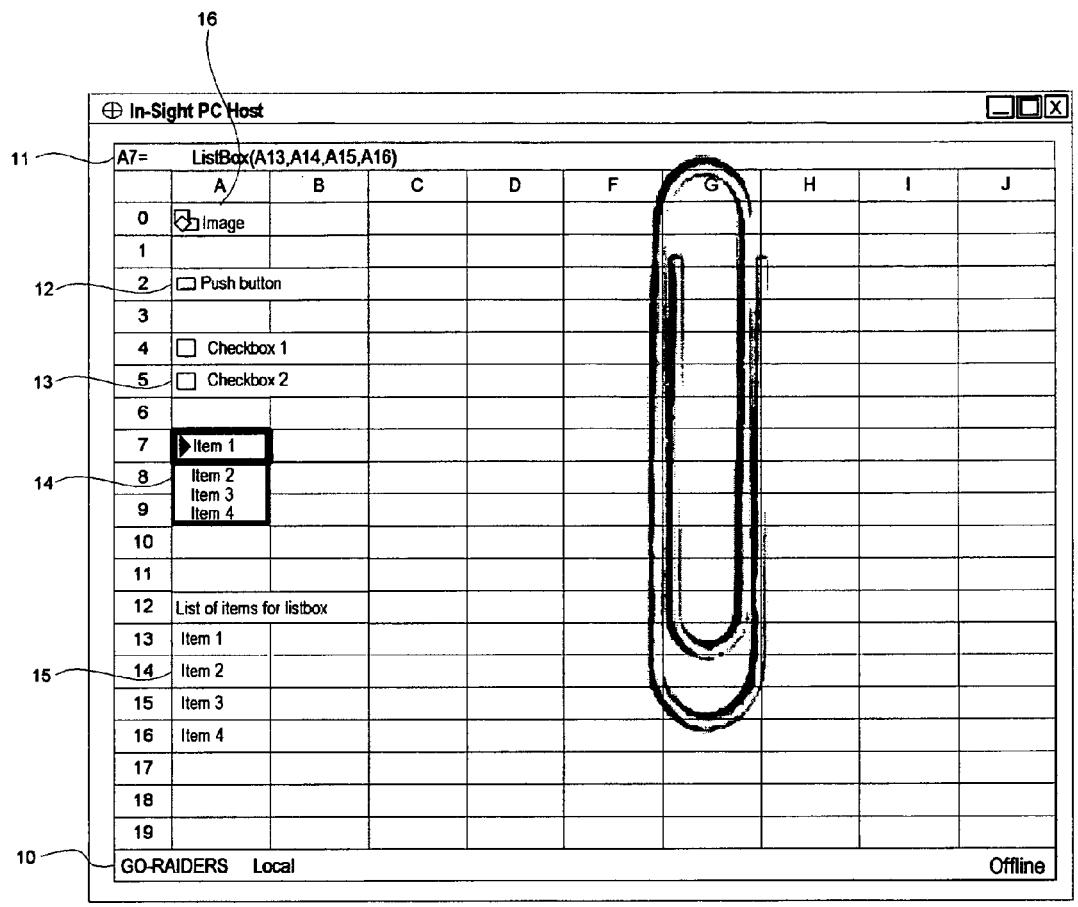
FIG. 1 shows a typical spreadsheet including an implementation of interface controls: Button, Checkbox, and Listbox superimposed on an image of a paperclip to be inspected by a Vision Processor (VP).
Figure 2:
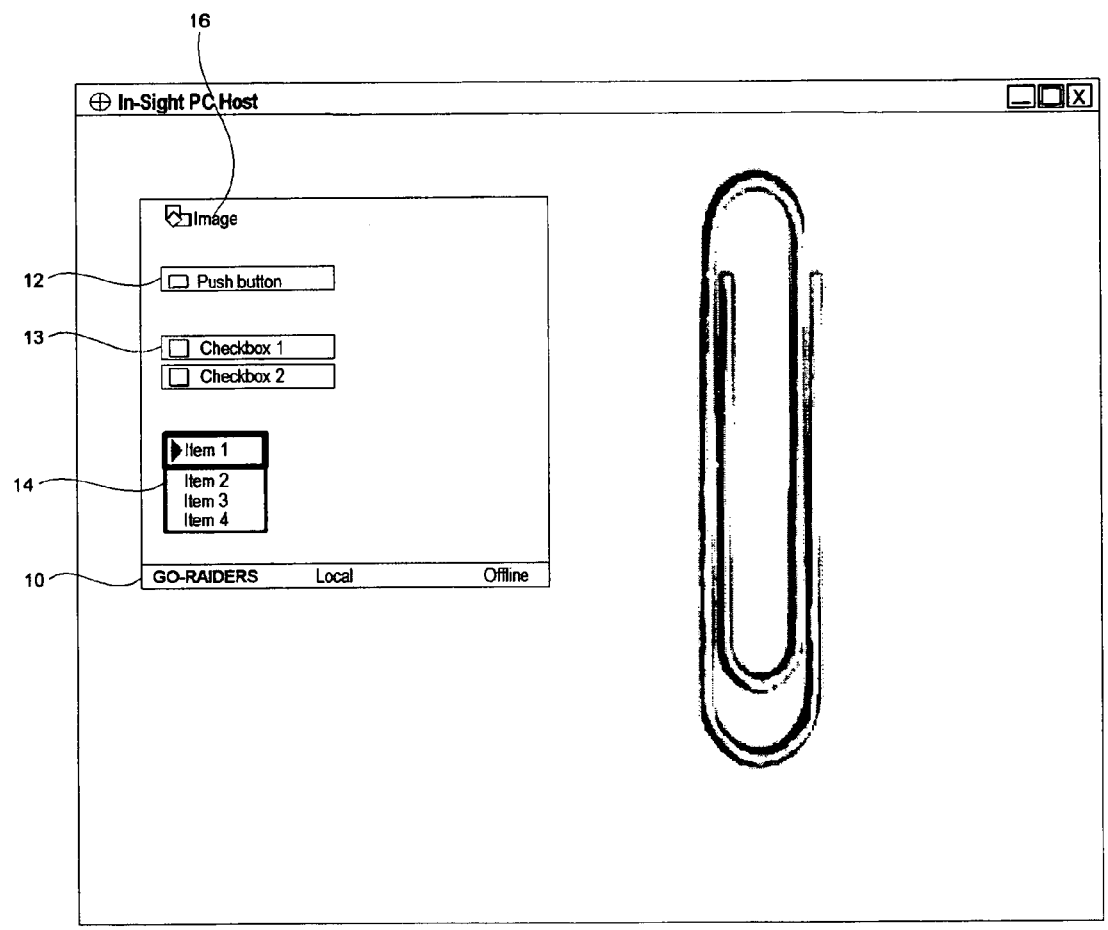
FIG. 2 shows an implementation of a custom user interface for the controls of FIG. 1.

FIG. 1 shows an example of a spreadsheet shown in standard view, such view as can be seen in any commercially available spreadsheet. The spreadsheet is shown in Full access mode (explained below), with a status line 10 and expression line 11. The Image cell 16 is used to store the image to be analyzed, such as the image of the paperclip translucently visible under the spreadsheet of FIG. 1. FIG. 2 is a custom interface, in custom view (explained below) of the spreadsheet of FIG. 1 in the Protected access mode (explained below). An example of a custom view is a view of the standard cells of FIG. 20 that lacks the spreadsheet grid of the standard view, and shows only selected standard cells. In other versions of a custom view, column and row headers and expression lines are also not included. Custom view setup is described below in conjunction with FIG. 17. Configuring a custom view allows a developer to limit the range of cursor motion, and to expand or shrink the display area used to show the view. A custom view can be translucent or opaque.

One aspect of the invention provides a method for creating a custom view of the interface that can be used to prevent the user from viewing some or all of the standard data cells, and to present a simpler and relatively unproblematic interface consisting of user interface cells displayed in the form of dialogs. Often, dialogs and custom views can maximize the ease and efficiency of data entry for the user.

The standard view of a spreadsheet, as presented by a typical spreadsheet software package, includes several components. These components include: an expression line, a matrix of cells demarcated by grid lines, and row and column headers. Further, the typical spreadsheet software indicates the selected (active) cell by highlighting the cell in some fashion so as to distinguish it from the remaining unselected cells. Movement from the currently selected cell to an unselected cell will cause the highlight on the formerly selected cell to revert to the unselected drawing state, and will cause the newly selected cell to be drawn in the highlighted state. The dimensions of the matrix itself, and the inclusion or exclusion of rows or columns in the display of the spreadsheet, are the limiting factors to movement within this matrix of cells.

A custom view might exclude one or more of these components. In a preferred embodiment of a custom view, the expression line, the grid lines, and the row and column headers are not displayed. Another preferred embodiment of a custom view includes the ability to limit the movement of the cell selection cursor to a defined subset of the spreadsheet matrix.

Figure 21:
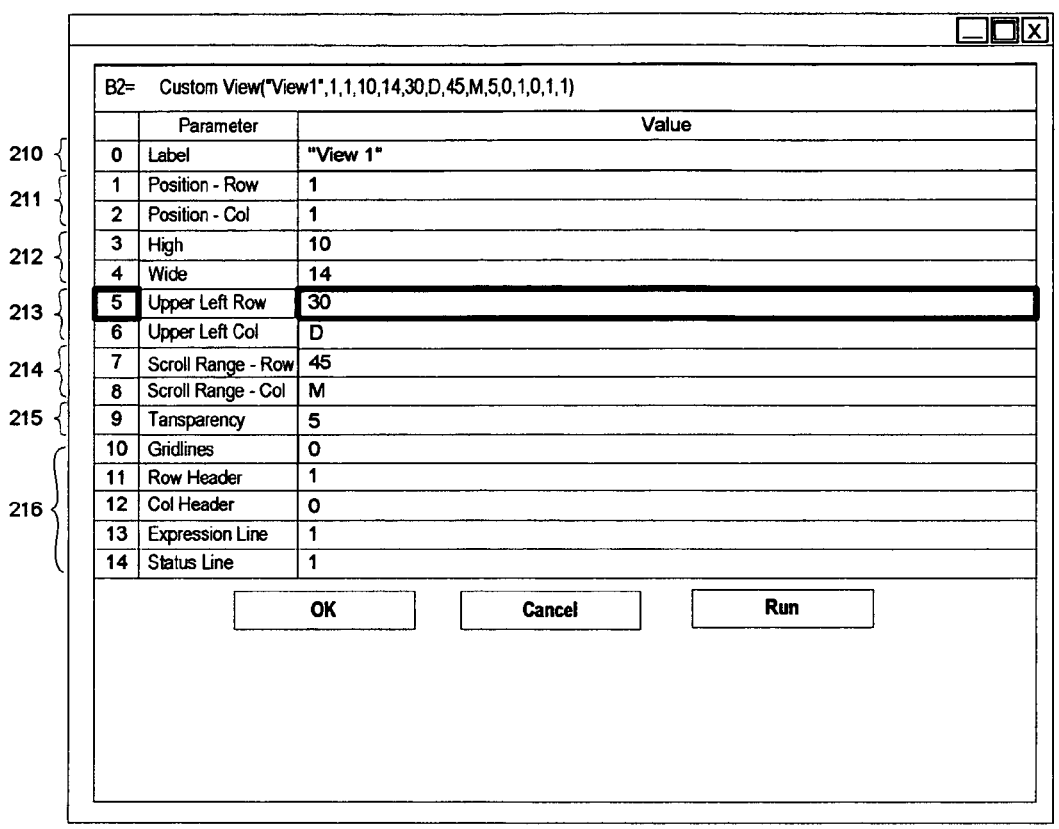
FIG. 21 shows the configuration of a preferred implementation of the CustomView function.

A custom view function CustomView, as shown in FIG. 21, inserted into the standard cells region of the spreadsheet, describes the layout of the custom view. The parameters of this function can contain a reference to another cell in the spreadsheet, and therefore the value for that parameter can be determined at run-time and not at development time. Parameters for a custom view function include: a descriptive label 210, placement of the display region 211, dimension of the display region 212, upper left cell 213, cell scroll range 214, transparency level 215, and display components 216 (row & column header, gridlines, expression line, status line).

Figure 22:
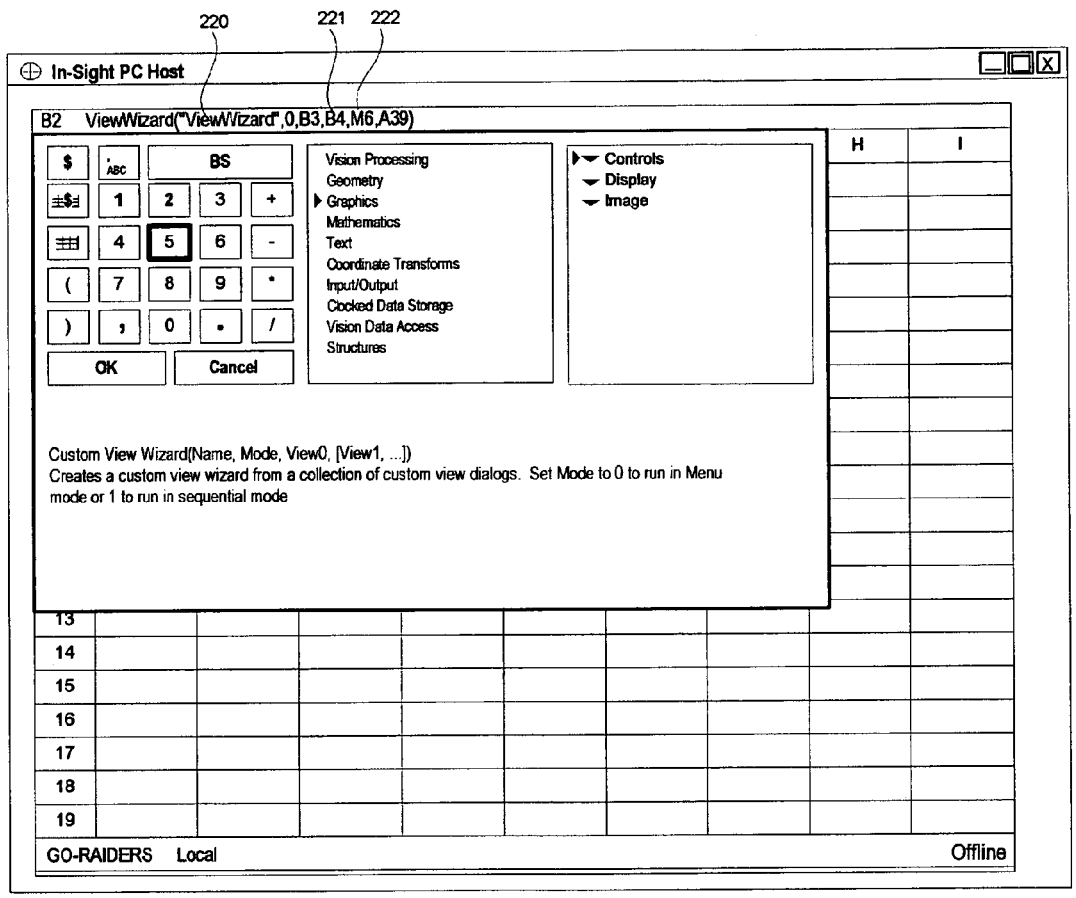
FIG. 22 shows the configuration of a preferred implementation of the ViewWizard function.

A collection of custom view functions can be included in a custom view wizard function, ViewWizard, as shown in FIG. 22. A custom view wizard is to be distinguished from a dialog wizard in that a dialog wizard manages a collection of Dialog functions whereas a custom view wizard manages a collection of CustomView functions. A custom view wizard could be used to show different portions of the spreadsheet in either a sequential or menu mode fashion. Further, the custom view wizard could be constructed in such a way as to be dynamic at run-time. This would cause the execution of the custom view wizard to adapt to user input or spreadsheet engine calculation results.

Figure 5:
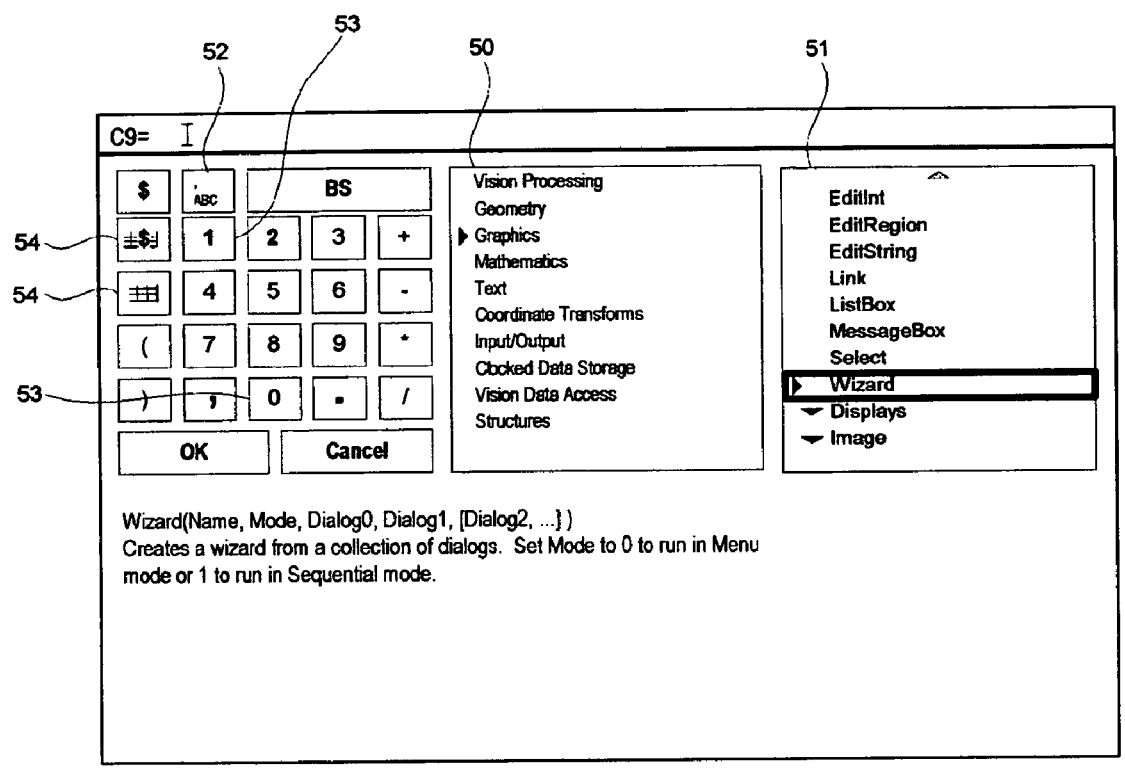
FIG. 5 shows the formula editor.

The ViewWizard function takes a variable number of parameters. This function is configured using the formula editor of FIG. 5 with an embodiment of the ViewWizard function shown in FIG. 22. To create a ViewWizard function, the developer selects the ViewWizard function entry in the right pane 51 (FIG. 5). The expression line in the formula editor reads: "B2= ViewWizard(". The formula editor waits for the parameter list to be completed by the developer. Next, the developer navigates to the text entry dialog button 52 (FIG. 5) and enters the name of the view wizard, as it will appear in the spreadsheet 220 (FIG. 22). Next, the developer selects either a 0 or 1 on the number pad portion of the formula editor 53 (FIG. 5) for the mode parameter 221 (FIG. 22). Finally, the developer uses the cell reference selection buttons 54 (FIG. 5) to specify the set of CustomView function cells 222 (FIG. 22) to be included in this ViewWizard function.

There are three modes of access to the spreadsheet: Full, Protected, and Locked. The mode of access determines the allowed level of user interaction with the spreadsheet. In Full access mode, the user has complete unrestricted access to the spreadsheet. In Protected access mode, only the cells defined in the custom view, which includes only standard cells which can include references to user interface cells. In protected areas, the interaction with cells is limited to the modification of the values of interface controls. For example, in FIG. 2, the checkbox's 13 can be "checked" or "unchecked" but the label appearing next to the checkbox can not be modified. Locked mode access restricts the user to only viewing the standard cells in the defined custom view and does not allow any cursor movement or interaction with the cells.

User interface cells can reference standard cells in the main spreadsheet as well as contain interface controls. Likewise, standard cells can reference user interface cells as well as contain interface controls. Interface controls, such as drop down lists, checkboxes, and buttons can be linked to or from spreadsheet data. FIG. 1 shows examples of interface controls in Full access mode: a Button 12, a Checkbox 13, and a Listbox 14. The expression line 11 shows that cell A7 contains a Listbox function with links to cells A13, A14, A15, and A16 (15) to populate the Listbox.

Figure 3:
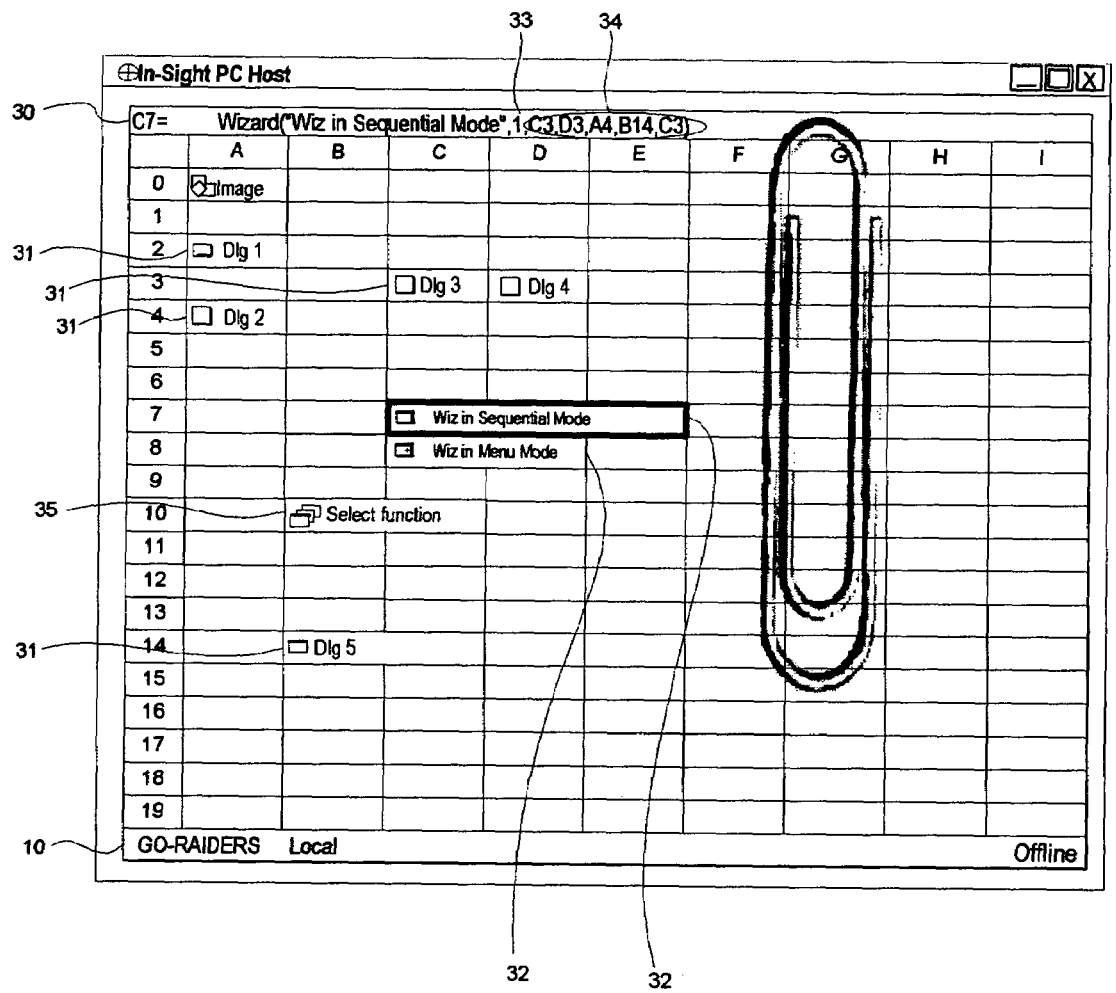
FIG. 3 shows an implementation of the Dialog, Select, and Wizard functions as user controls.
Figure 4:
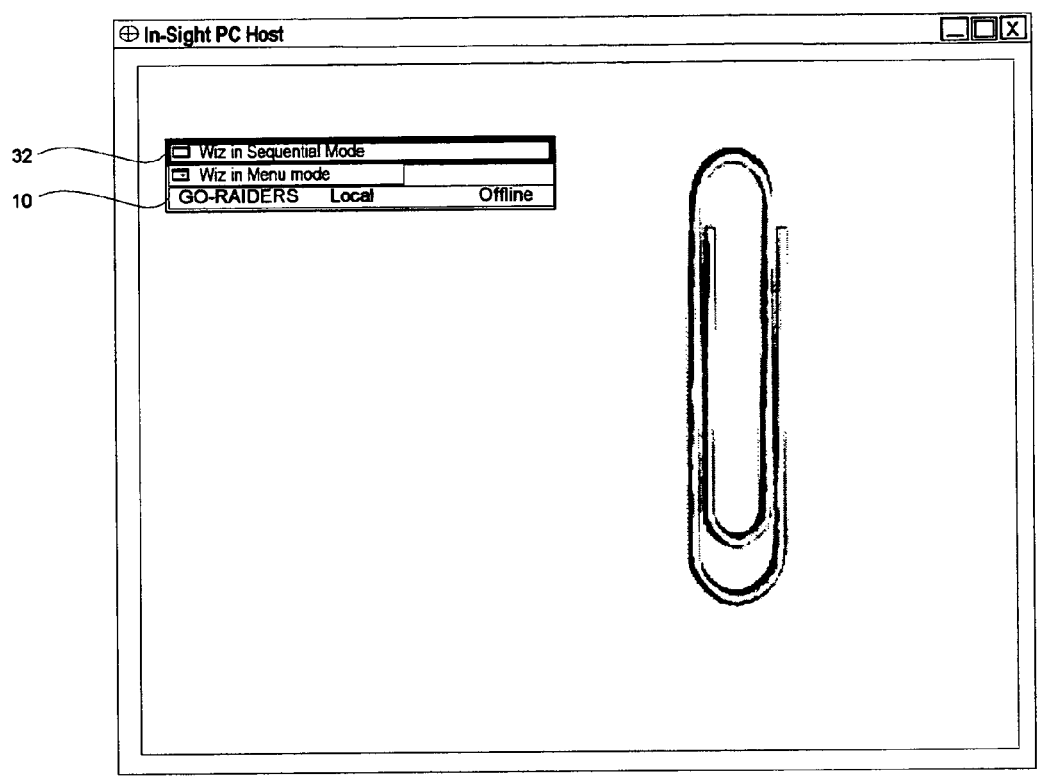
FIG. 4 shows an implementation of a custom interface for the Wizard functions as user controls.

FIG. 3 shows an example of a spreadsheet that contains a Select function 35 and multiple Dialog functions 31 and Wizard functions 32. These functions may be placed in any empty standard cell in the spreadsheet, with no relationship established by proximity to one another. It is evident from the expression line 30 that the Wizard function consists of a set of Dialog functions 34 and presents the dialogs in one of two modes 33, "sequential" or "menu", which is explained below. There are two methods that can be used to invoke dialogs and wizards. These methods are interactively (the user selects the cell using an input device), or programmatically (using a select function 35, for example). FIG. 4 shows a possible customized presentation of the spreadsheet of FIG. 3, in Protected access mode, that does not expose the Select function, nor the individual Dialog functions that comprise the Wizard functions.

The interface creation method of the invention uses the spreadsheet to create an interface for the spreadsheet. Further, by using wizards, a sequential order can be imposed on the data entry process. Creating an interface requires that the developer learn only two, or optionally three, simple functions, and these functions are used in the same way as any other spreadsheet function. Consequently, programming is simplified to such an extent that non-professional programmers can use it effectively.

This invention also solves the redesign problem. Modifications to the spreadsheet, by row or column insertion or deletion, or by cell contents being rearranged, etc. have no impact on a dialog's presentation. The dialog presentation is defined within the Dialog function. Once a dialog has been defined, and the contents of the user interface cells of that dialog have been defined (an example is FIG. 14), manipulation of the standard cells, by row or column insertion or deletion will have no impact on the user interface cells, and consequently on the dialog. Thus, references between standard cells and user interface cells will be maintained under any cell movement actions.

Likewise, the wizard behavior is defined within the Wizard function. In a Wizard function, rearranging dialog presentation order simply requires deleting the current cell selection list and referencing the new cells in the appropriate order. Changes to the other standard cells of the spreadsheet do not impact the wizard nor the display of the dialogs within the wizard.

This invention resolves the major shortcomings to current user interface creation solutions for a variety of environments including: spreadsheet, database, machine vision, word-processing, industrial automation, instrument monitoring and control, etc. This invention requires a minimal amount of training, is faster in developing a custom interface than traditional programming, and makes it easier to modify an existing interface.

Figure 9:
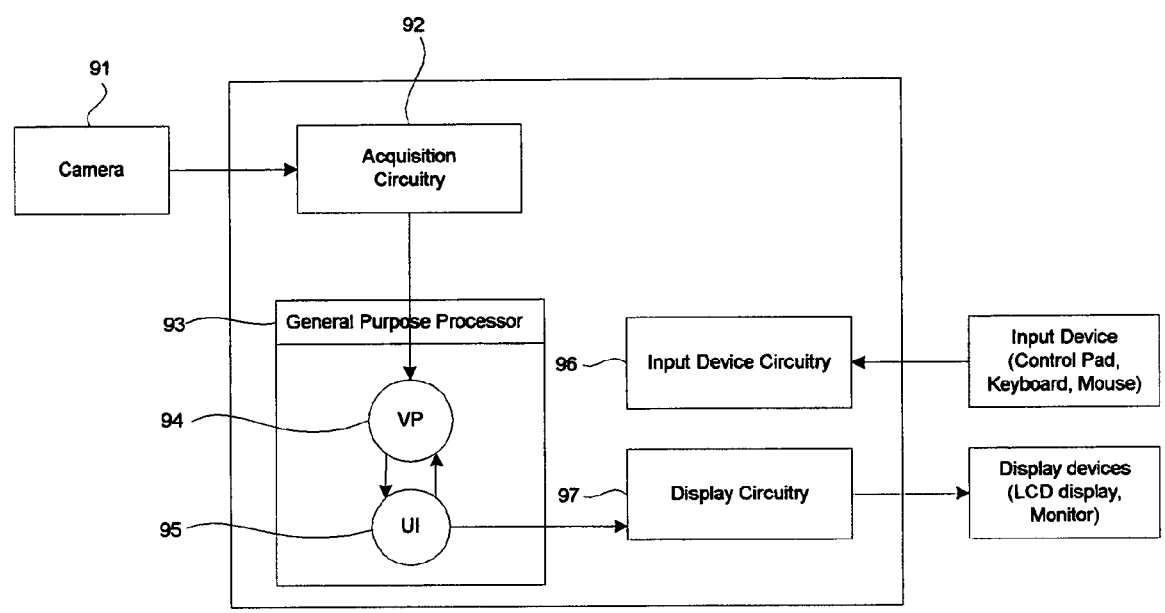
FIG. 9 is a block diagram showing a standalone machine vision system in which both the vision processor and the user interface are realized in a single computer.

By way of illustration, an instance of the invention will be described wherein it is applied to create a user interface for a machine vision application program. Referring to FIG. 9, a machine vision system is a collection of one or more vision processors (VPs) and optionally one or more user interfaces (UIs). Each VP is connected to one or more electronic cameras through which the VP "sees" its environment and objects in it, such as the paperclip shown in FIGS. 1–4, for example. The UI and the VP may coexist on the same computer platform, in which case the camera 91 is connected via acquisition circuitry 92 to a general purpose processor 93 (such as a microprocessor, digital signal processor, or CPU). The general purpose processor runs a program that implements a VP 94 and a UI 95 that communicate with one another via shared memory. The UI interfaces with a user using one or more input devices (such as a control pad, a keyboard, or a mouse) via input device circuitry 96 and provides a graphical display to the user on a display device (such as an LCD display or a computer monitor) via display circuitry 97.

Figure 10:
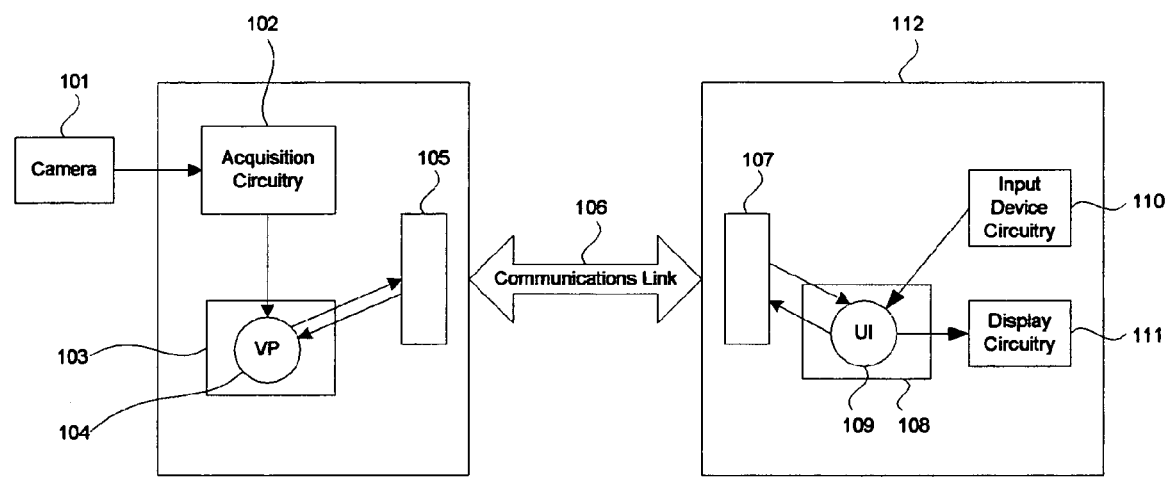
FIG. 10 is a block diagram showing a machine vision system comprised of a user interface computer connected with a vision processor computer via a general-purpose communications link.

Alternatively, referring to FIG. 10, the VP and the UI may exist on separate computer systems. This configuration shares the components of the single-computer vision system, but runs the VP on a different general purpose processor from the UI. The camera 101 is connected via acquisition circuitry 102 to a general purpose processor 103. This processor runs a program that implements a VP 104 and communicates via communications circuitry 105 across a communications channel 106 (such as an RS232 serial connection or an ethernet connection) to the computer running the UI. The UI computer 112 houses a general purpose processor 108 that runs a program implementing the UI 109. The UI communicates with the VP computer via communications circuitry 107 and the communications link 106. A user may control the UI via one or more input devices connected to the input device circuitry 110 and view graphical output via display circuitry 111 on a display device.

Figure 11:
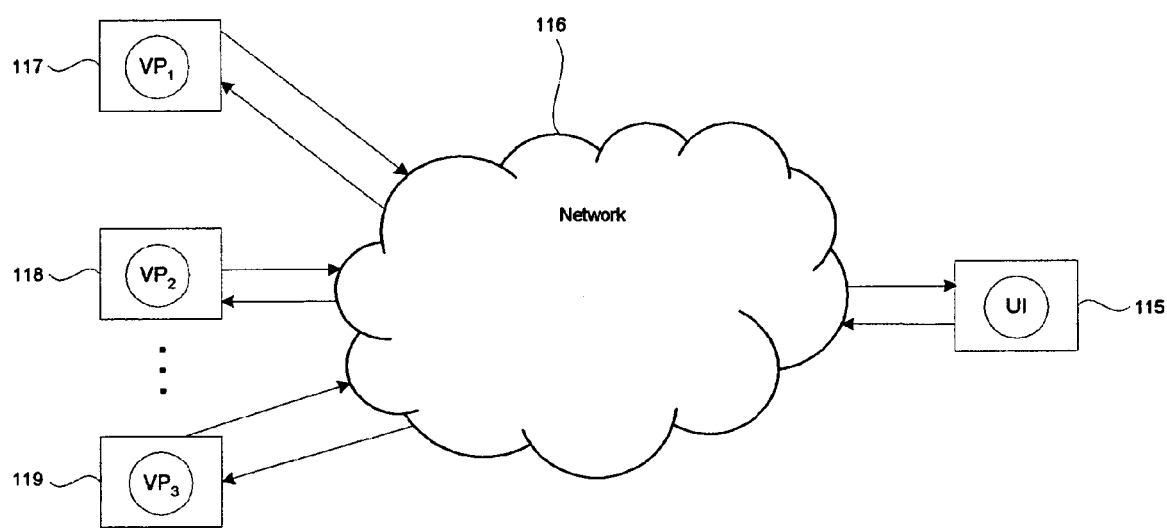
FIG. 11 is a block diagram showing a networked machine vision system comprised of a plurality of vision processor computers connected via a network to a user interface computer.
Figure 12:
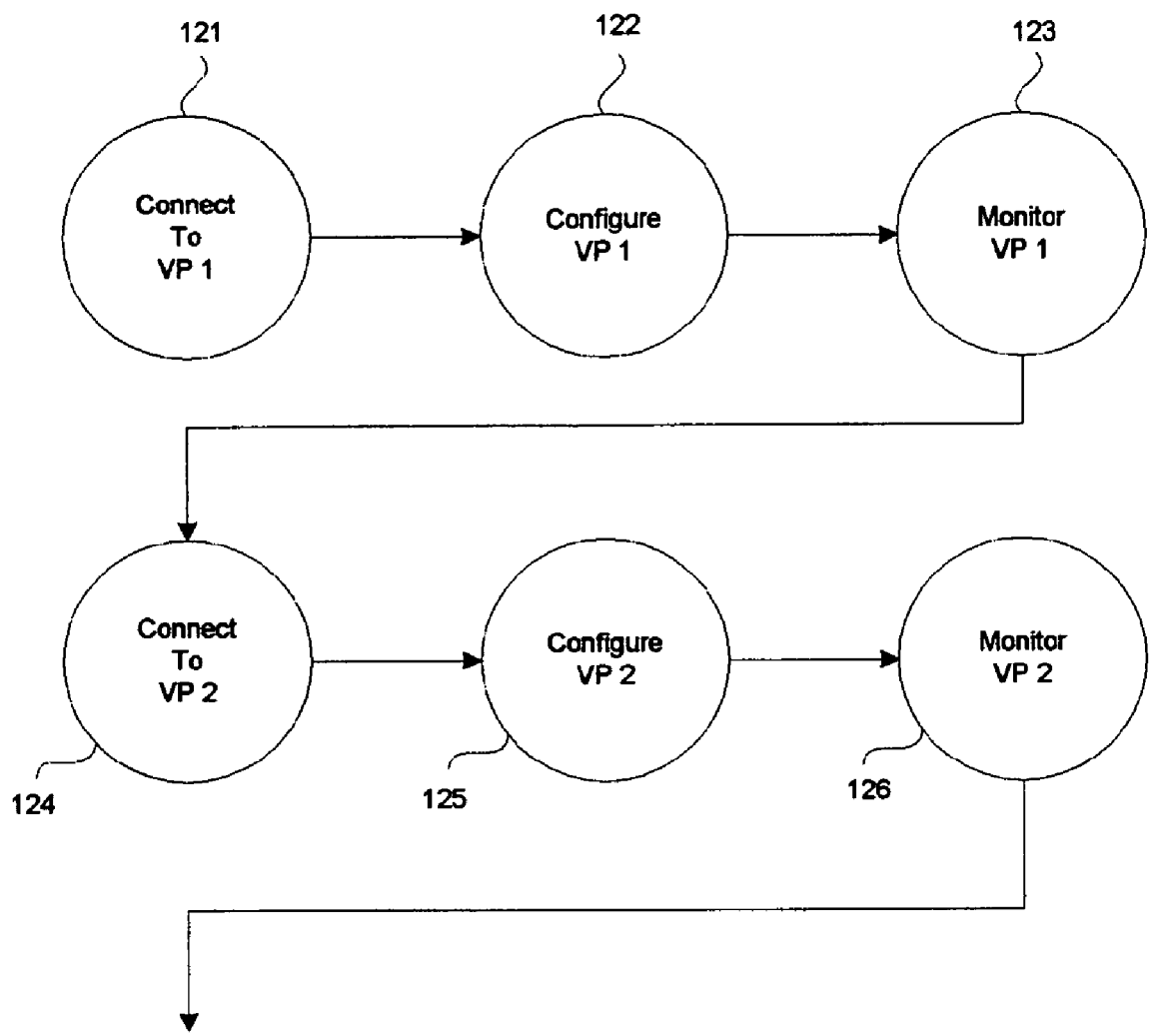
FIG. 12 shows the sequence of operations performed by a developer setting up a two-VP vision system.

If the communications channel provides access to a network, several additional connection schemes are also possible: each UI 115 can communicate via that network 116 with one of many networked VPs 117, 118, 119, as shown in FIG. 11. When a user (either a developer who will configure a VP for a specific vision task, or an operator who will monitor the system during the operation phase) desires to communicate with a particular VP, the user selects the new VP from a list provided by the UI and instructs the UI to establish a connection. In this way, many UIs may control each VP, and each UI may control many VPs. A collection of VPs may work together to solve a complex vision problem—in this case each VP in the collection solves a particular subset of the overall vision problem.

There are three modes of operation of a vision system, during which different actions take place on the UI and VP:

1. Connection—using the UI, the developer or the operator selects a VP from a list of all available VPs, possibly displayed in a menu by the UI. UI establishes initial communications with the VP. The connection phase establishes data communications between the UI and the VP. One embodiment of such a data connection is an application layer connection (possibly using a client/server model) in the OSI communication model.
2. Configuration—through the UI, developer configures the connected VP for a specific vision task. There are as many different communications protocols as there are different networked applications.
3. Operation—the VP executes the sequence of functions defined by the user during the configuration phase. The UI may be used by an operator to monitor the outputs of the VP, or may be disconnected from the VP, allowing the VP to run standalone.

When designing a vision application, a developer typically connects to a specific VP 121 and then performs one or more cycles of configuration 122 and operation 123. After the developer is satisfied with the configuration of the first VP, the developer may connect to a second VP 124 and complete a cycle of configuration 125 and operation 126 of that system. This process may be repeated for additional available VPs.

Figure 14:
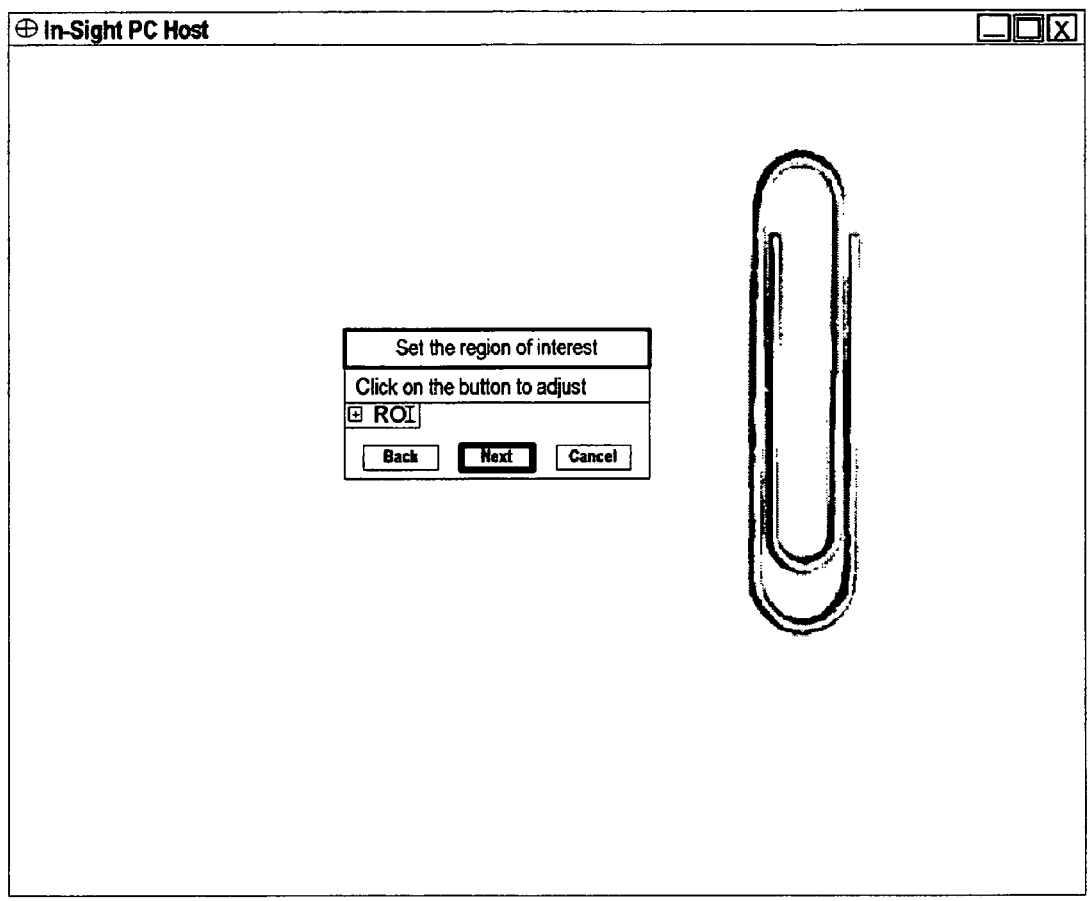
FIG. 14 shows an implementation of the second Dialog function of a Wizard.
Figure 16:
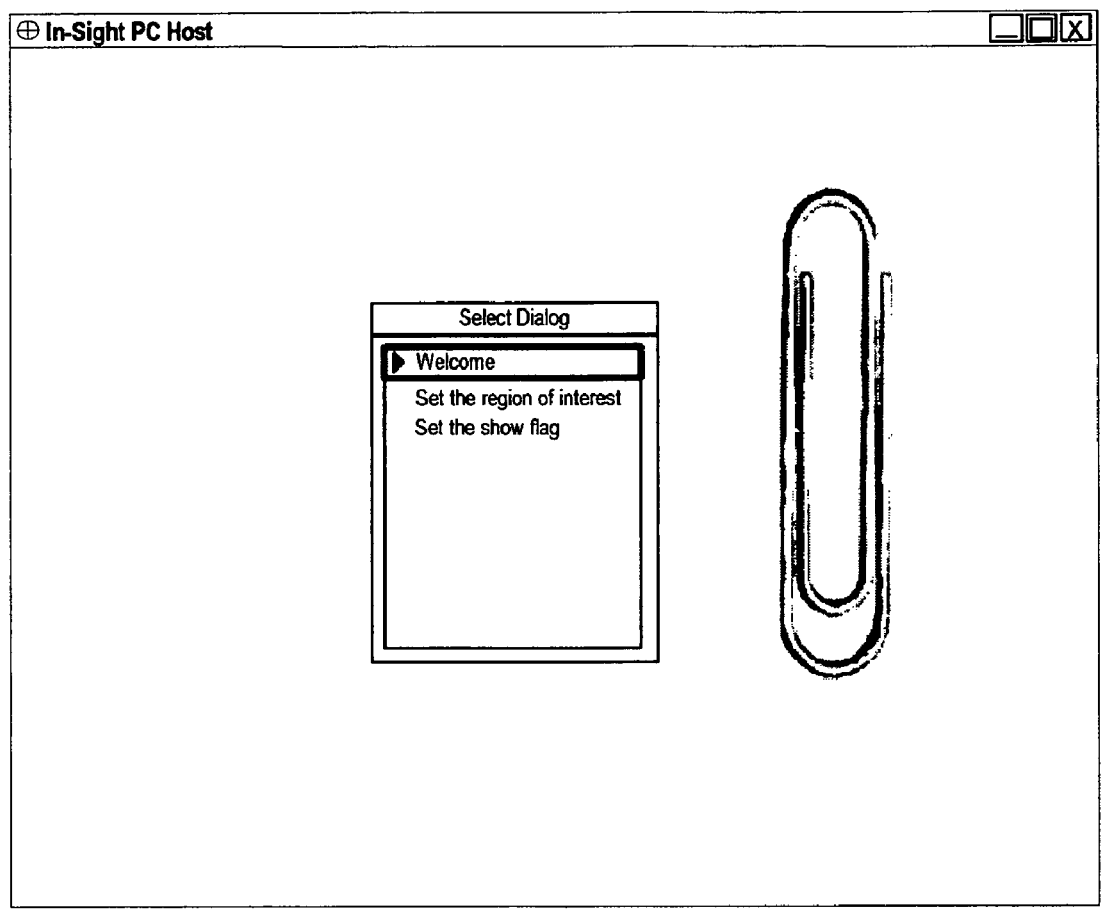
FIG. 16 shows an implementation of the listbox of Dialog functions of a Wizard in menu mode.

Once the developer has properly configured the vision system, a user will monitor the functioning system and notify the developer of problems with the vision system configuration that must be corrected. The user may only make changes to parameters in the system configuration to maintain the functioning of the vision system. For example, the user may specify a region of interest (ROI) of an image to guide the behavior of VP functions using a dialog in a wizard as shown in FIGS. 14 and 16. In order to make the system accessible to the user, the developer must implement visual feedback and allow constrained user interaction.

For a human, a typical vision task is simple. An example is to find an object, such as the paperclip as shown in FIGS. 1 through 4, and verify it is correctly shaped. This same task for a VP is usually fairly complex. The complexity is at development time, which is undertaken by the developer. Only minimal interaction with the system may be necessary for the user. As recognized by the invention, a UI needs to be adaptable to the mode of operation of the VP: development or runtime. The invention also recognizes that it is important that an application developer be able to concentrate on development of the application, not the laborious programming of a user interface. According to the invention, the creation of an appropriate user interface for the VP does not require the developer to learn and use a separate programming or scripting language. In fact, it is an extension of the system that is used to develop the vision application that runs on the VP itself.

This invention provides a method for enabling the creation and control of a user interface using functions within the user interface itself. These functions are the Select, Dialog and Wizard functions, as explained herein. This permits the implementation of a configurable interface that functions optimally for a given application program, such as a machine vision application.

For example, the default user interface for a VP can be a spreadsheet consisting of cells arrayed in 26 columns by 400 rows. Cell contents may include functions, mathematical expressions, and data that are processed by the VP.

In addition to standard functions that merely transform parameters to results, there are two other classes of functions important to all VPs: input functions and output functions. Input functions read information from hardware devices: their results vary depending on the state of these devices. Like input functions, output functions interact with specialized hardware devices. However, their behavior is to assert a state upon the connected external entity.

Functions may also have a combination of input and output behaviors. These functions, referred to as control functions, direct the UI to display a particular graphical item, and produce a result when the UI informs the VP that the user has interacted with the item.

By default, each cell and its contents is exposed in the user interface. However, according to the invention, it is sometimes necessary to limit the accessibility and appearance of particular cells during runtime operation. Further, the runtime state, or value, of a cell might dictate the invocation of the UI. For example, the conditional evaluation of a cell might hide other cells or expose cells for display or modification. Or, the value of a cell can enforce a strict sequence of data entry in other cells. The sequence of dialogs presented and the contents of the dialogs presented can be constructed so as to be responsive to user input in real time.

The invention provides a set of control functions that gives the developer the ability to control the UI at run-time. These functions are inserted into and executed by the VP in a manner consistent with any other function. The functions are:

1. Dialog functions: control functions that provide access to a subset of the entire range of user interface cells.
2. Wizard functions: control functions that manage the access and display of a set of dialog functions.
3. Select functions: functions that invoke Dialog or Wizard functions, either interactively or programmatically, from a list of Dialog and/or Wizard functions, based on an index parameter.

FIG. 3 shows examples of Dialog, Select and Wizard control functions displayed by the standard spreadsheet interface in Full access mode.

A developer inserts a function into the spreadsheet with the formula editor, as shown in FIG. 5. There are two types of functions that can be entered using the formula editor: fixed-number-of-parameter functions and variable-number-of-parameter functions. A Dialog function is representative of a fixed-number-of-parameter list function. The Select and Wizard functions are examples of variable-number-of-parameter functions. Inserting either type of function begins with the formula editor of FIG. 5. The developer navigates the center and right sections of the editor to select the desired function. As a tool category is highlighted in the center 50, a list of that category's functions appears in the right section 51, organized within subcategories. Highlighting indicates the current category and function selections. When a function is selected, for fixed-number-of-parameter functions, a property sheet is displayed (FIG. 6) where the developer can configure the individual parameters. For variable-number-of-parameter functions, configuration of parameters is done within the formula editor as described below.

Figure 6:
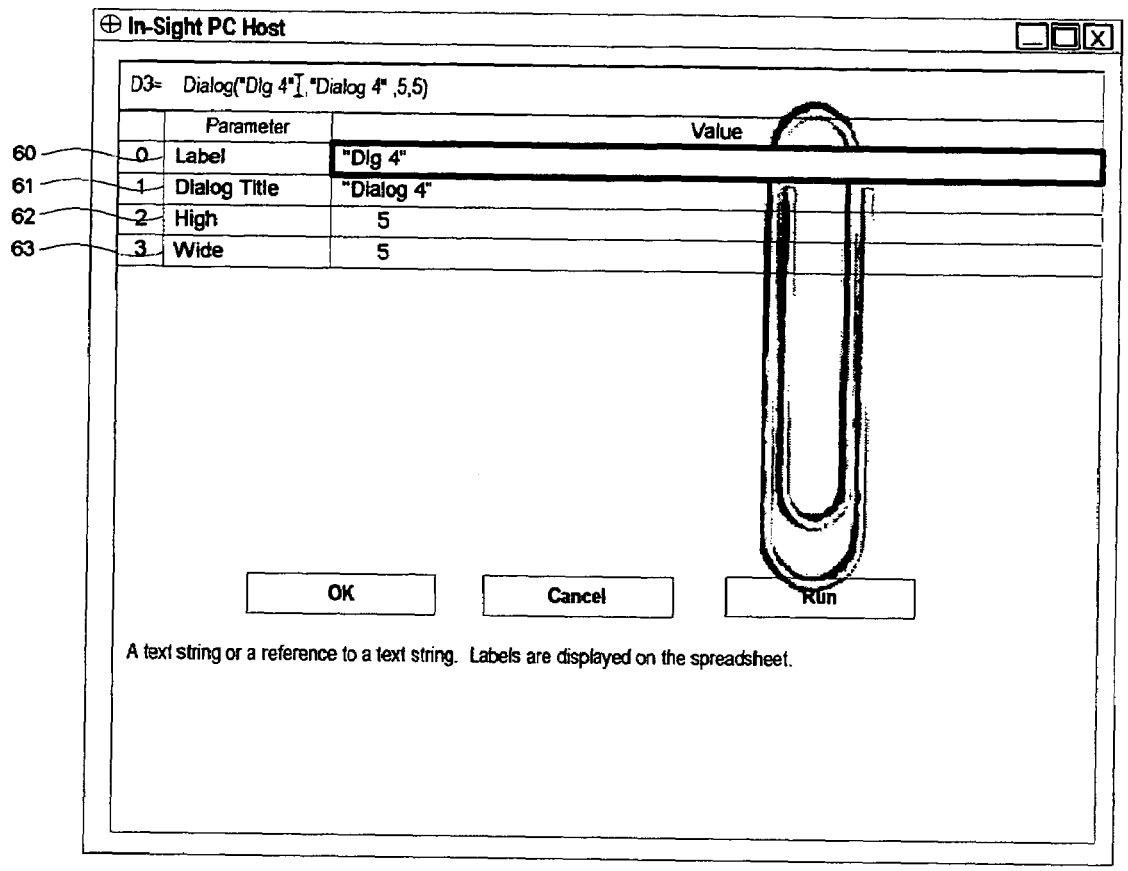
FIG. 6 shows the configuration of a preferred implementation of the Dialog function.
Figure 18:
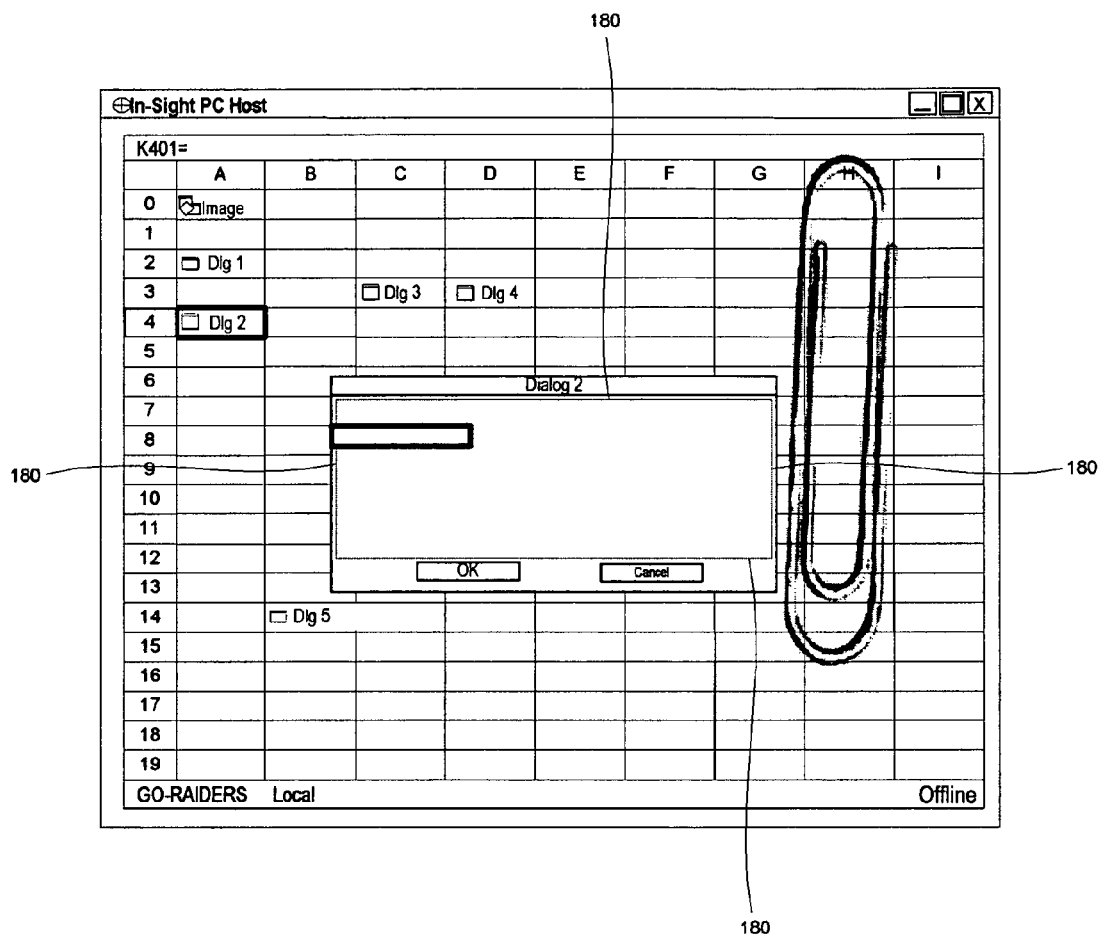
FIG. 18 shows the bounding region of cursor movement within a dialog.

In a preferred embodiment, the Dialog function has four parameters, shown in FIG. 6. Label 60 is a string that is displayed in a spreadsheet cell when the Dialog function is inserted into the spreadsheet. Dialog Title 61 is a string that will appear in the title bar of the dialog when displayed as a window in the UI, as shown in FIG. 18 for example. High 62 specifies the height of the cursor region of the dialog, in number of cells (1 to 20 cells). Wide 63 specifies the width of the cursor region of the dialog, in number of cells (3 to 10 cells).

Figure 7:
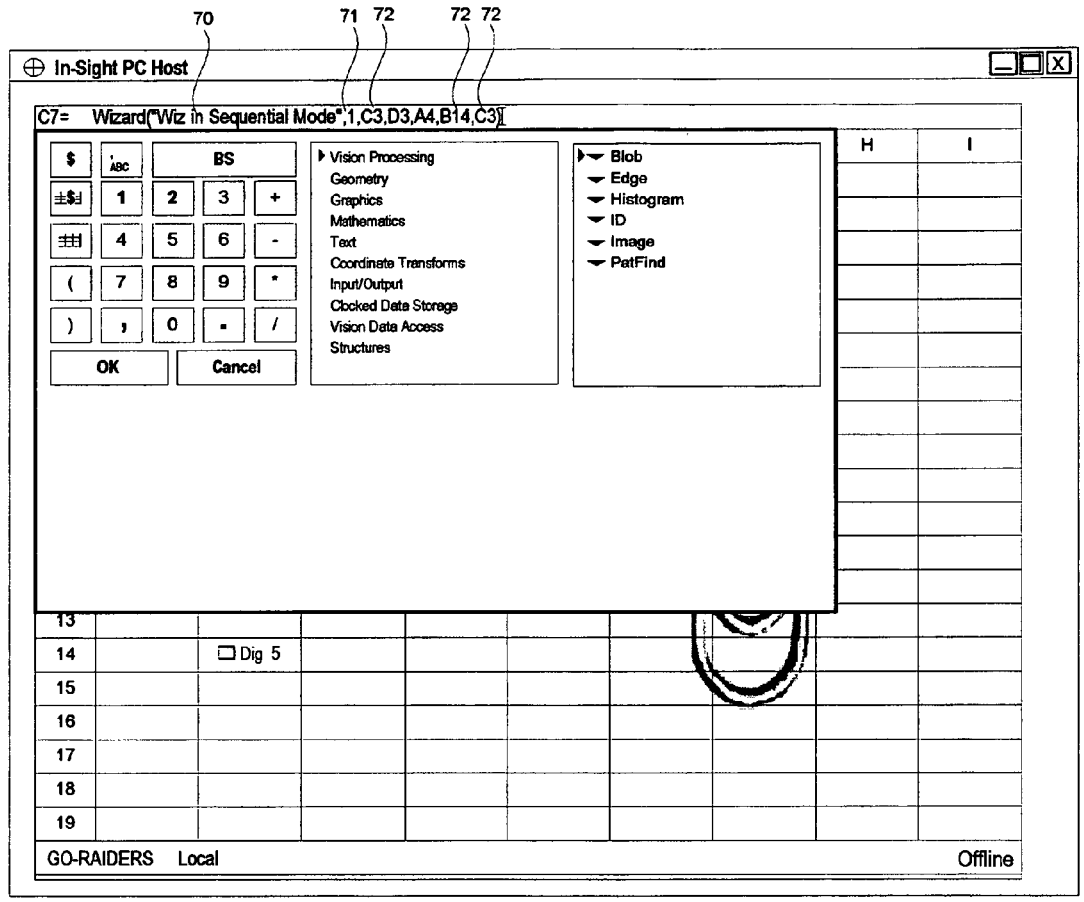
FIG. 7 shows the configuration of a preferred implementation of the Wizard function.

The Select and Wizard function each take a variable number of parameters. These functions are configured using the formula editor of FIG. 5 with an embodiment of the Wizard function shown in FIG. 7 and the Select function in FIG. 8. To create a Wizard function, the developer selects the Wizard function entry in the right pane 51 (FIG. 5). The expression line in the formula editor will read: "C9= Wizard (". The formula editor will be waiting for the parameter list to be completed by the developer. Next, the developer navigates to the text entry dialog button 52 and enters the name of the wizard, as it will appear in the spreadsheet 70 (FIG. 7). Next, the developer selects either a 0 or 1 on the number pad portion of the formula editor 53 for the mode parameter 71 (FIG. 7). Finally, the developer uses the cell reference selection buttons 54 to specify the set of Dialog function cells 72 (FIG. 7) to be included in this Wizard function.

Figure 8:
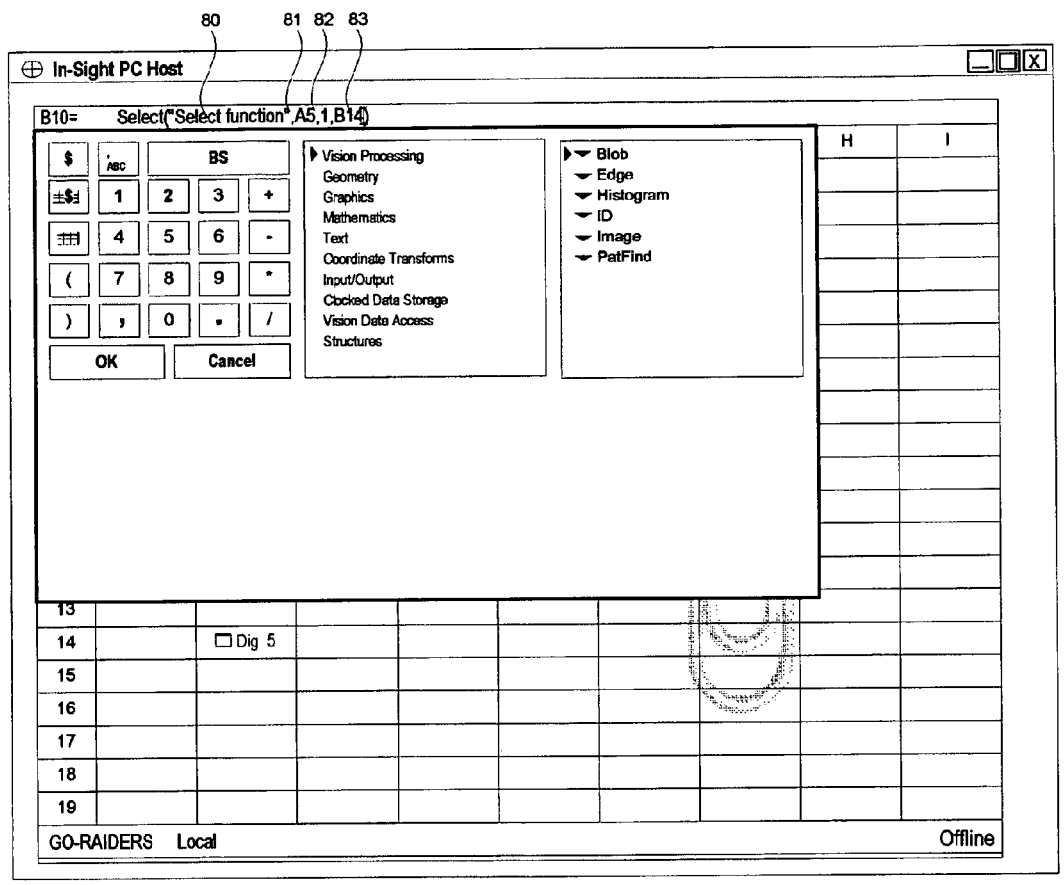
FIG. 8 shows the configuration of a preferred implementation of the Select function.

The technique for configuring the Select function follows the technique for configuring the Wizard function, but the parameter list is different. Using the text entry dialog button 52, a name for the function is entered as it will appear in the spreadsheet 80 (FIG. 8). The number pad 53 or reference selection buttons 54 are used to enter an index number 81 (FIG. 8) of the control to execute from the variable list of cell references. A 1 or 0, is entered as the third parameter 82 (FIG. 8) of the select function to specify if the function requires user interaction. Finally, the cell reference selection buttons 54 are used to specify the set of Dialog or Wizard function cells 83 (FIG. 8) to be included in this Select function.

A dialog can be opened and manipulated individually by selecting it directly in the spreadsheet, or programmatically with a Select function, or it can be manipulated as presented to a user by a Wizard. The Wizard function is used to treat a plurality of Dialog functions as a group. An option of the Wizard function determines, by parameter within the Wizard function, if the dialogs of the group are displayed in a sequential order, or as a list where the user determines which dialog to manipulate.

Figure 13:
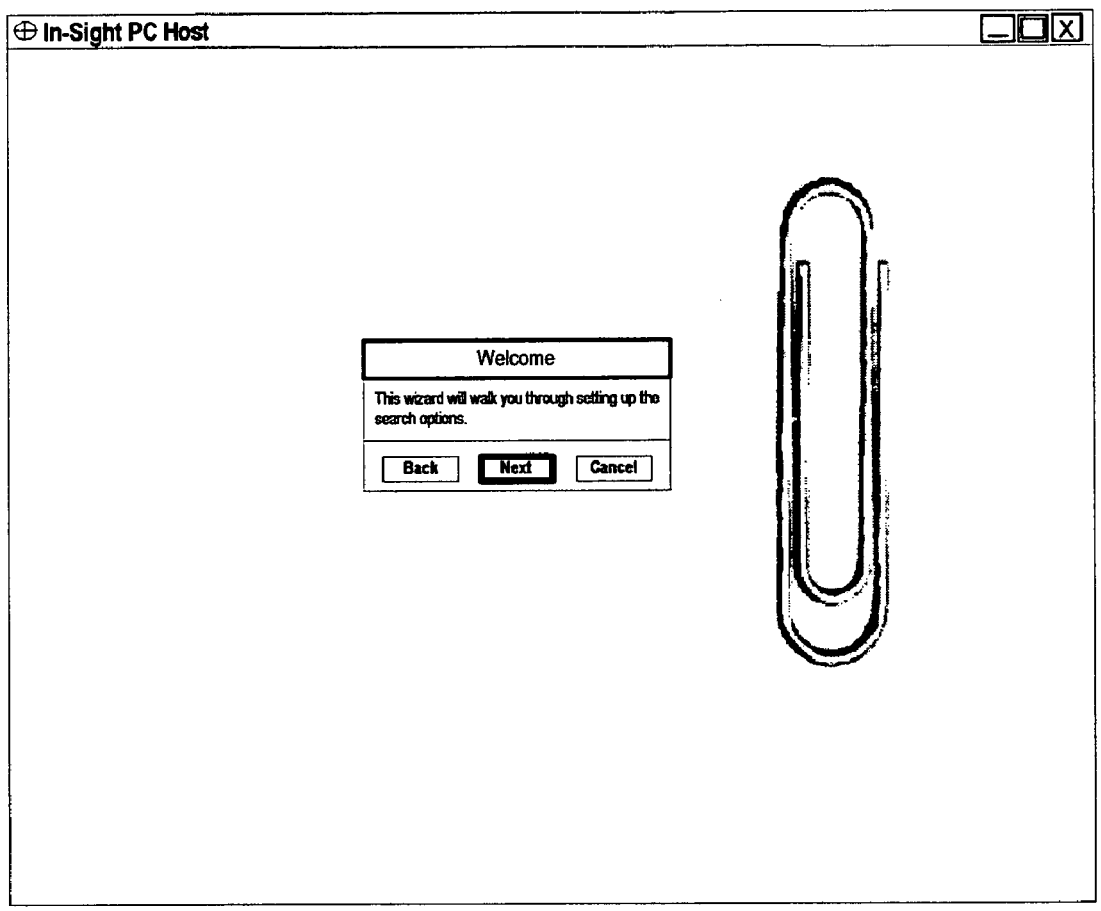
FIG. 13 shows an implementation of the first Dialog function of a Wizard.
Figure 15:
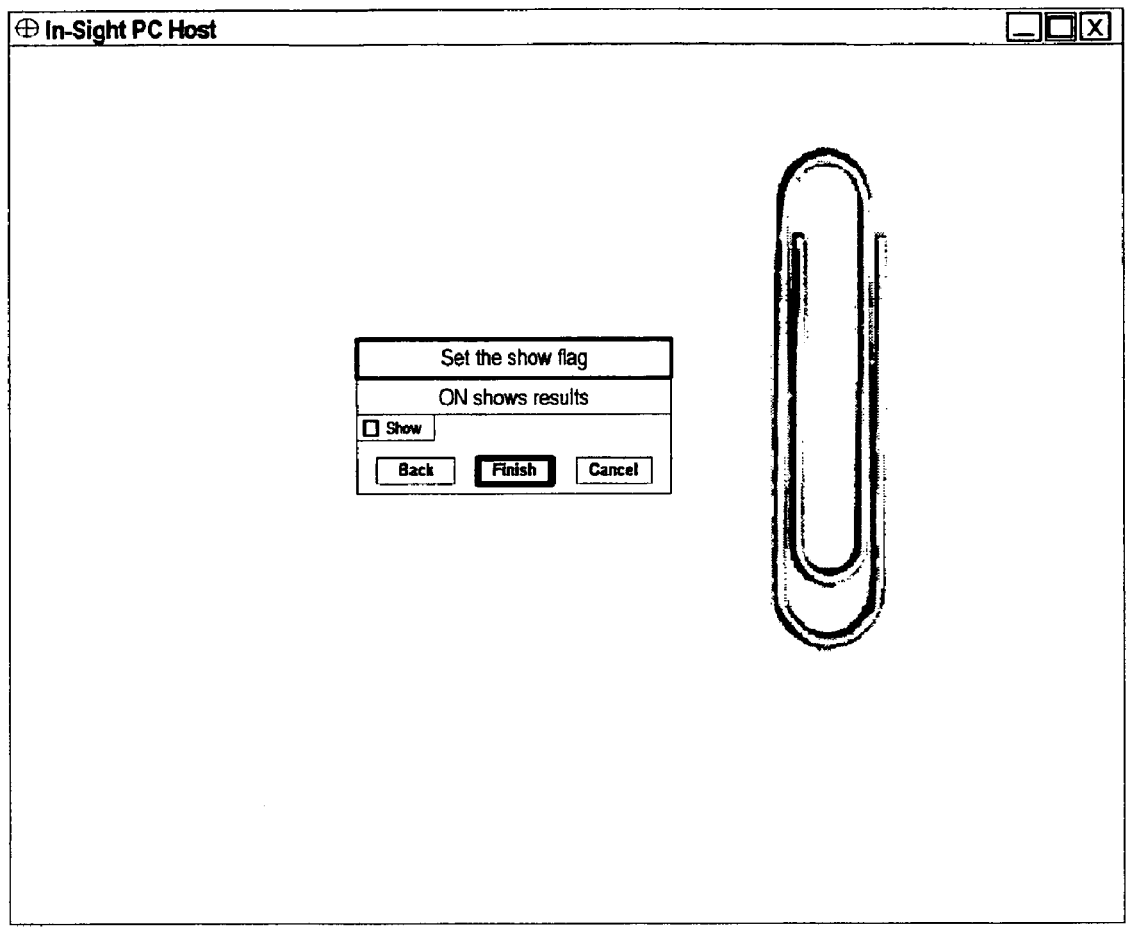
FIG. 15 shows an implementation of the final Dialog function of a Wizard.

A series of dialogs can be combined into a step-by-step (sequential) mode wizard as represented by FIGS. 13, 14, and 15. In this way, it is possible to ensure that a user enters data in an appropriate sequence. If order of input is not important, it is possible to list all dialogs in a menu, which allows the user to access them in any order. This is represented by FIG. 16. The selection of dialogs to include in a wizard is done by choosing a starting cell and highlighting, using the keyboard, mouse, or game pad, a group of neighboring cells, for example. Multiple selection lists can be added to a Wizard function. To rearrange dialog presentation order simply requires deleting the current cell selection list and referencing the new cells in the appropriate order.

The developer of an application can run the application in either of two views: standard or custom. The Custom View allows the application developer to create a display that shows only the most important data of the job, hiding all of the detailed formulas in the spreadsheet. When interface controls, such as Dialogs and Wizards, are included in the custom view, the user on the production floor can make simple adjustments to the job configuration, but they cannot modify formulas directly in the spreadsheet.

Figure 17:
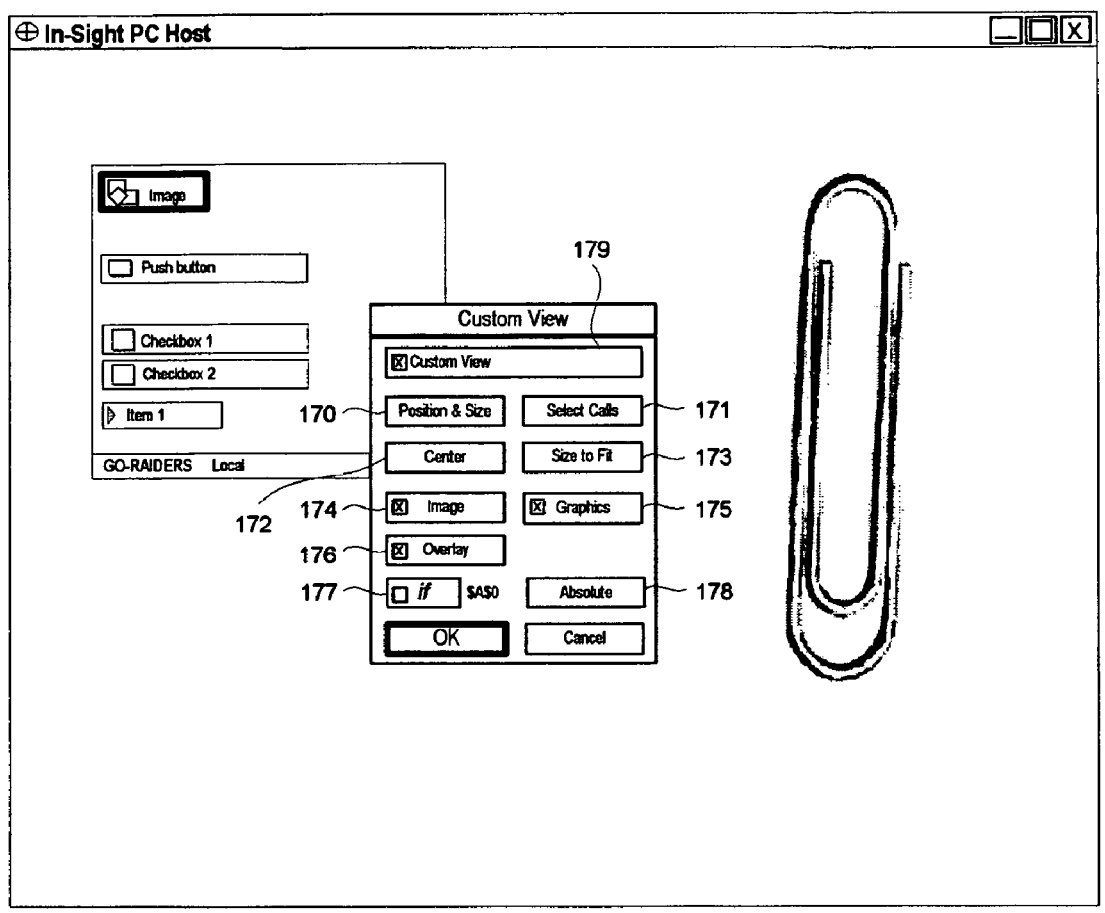
FIG. 17 shows the Custom View configuration dialog.

The custom view configuration dialog FIG. 17 is used to design the default or starting view of the application, unless the user is in full access mode, wherein the user will be in a standard view of the spreadsheet. To configure the position and size of the custom view in the display select the Position & Size button 170. To select the range of cells to include in the custom view select Select Cells 171. If the range of cells selected is too large to fit within the defined Position & Size, then the custom view will permit scrolling in order to access all cells in the range. Otherwise, cell selection is limited to those cells within the set range. The Center button 172 positions the custom view in the center of the display, overriding the location set by the Position & Size 170. Size To Fit 173 resizes the custom view to fit the range specified in the Select Cells 171 and overrides the size set by Position & Size 170. The custom view display can be configured to show certain elements, and when to refresh the display. Image 174 is used to display the image beneath the custom view overlay, e.g., the image of the paper clip. Graphics 175 is used to display overlay graphics on top of the image. Overlay 176 is used to turn the custom view overlay on or off. The if 177 checkbox, in conjunction with the cell referenced by Absolute 178, is used to determine when the enabled display elements will refresh. The Custom View checkbox 179 is used to enable custom view upon dismissal of this dialog.

The user selects or clicks on a graphical representation of the Dialog or Wizard function, which causes execution of the function. When executed, the Dialog or Wizard function sends a command to the UI to describe the presentation. The model of the invention is that no script or compiled programming language is required to control the UI. The spreadsheet application executes the UI by implementing control functions, Dialog and Wizard, within the application itself.

Dialogs are defined using a reserved, 200-row region of user interface cells of the spreadsheet. Each Dialog function is assigned a separate 10×20 block of user interface cells within the 200-row region of user interface cells, and is assigned a unique index value that determines which 10×20 block of user interface cells has been assigned to that Dialog function. The viewable and navigable portion of the 10×20 block range of user interface cells is dictated by the High and Wide parameter of the Dialog function. This range is shown in FIG. 18 by the dotted lines 180. Adjusting the High and Wide parameters will either enlarge or restrict the range of viewable cells up to the 10×20 cell limit.

A maximum of twenty dialogs, or Dialog functions can be inserted in an application. These numbers came from the fact that a dialog that encompasses the entire physical VGA display can be 10 cells wide by 20 cells high. A single row of a 26-column spreadsheet can fit two 10 cell wide blocks of data, so 20 rows can fit two dialogs. From here, it was decided that a maximum of twenty dialogs would be sufficient for a single application although more or less could be used. Twenty dialogs would provide flexibility without significant resource (memory) consumption. This restricted user interface region of cells is treated independently of the standard region of cells, and neither affects nor is affected by the display characteristics of the standard 26×400-cell region of the spreadsheet. As shown in FIG. 20, the spreadsheet is a 26×600 matrix 200 divided into two distinct cell regions. These regions are the standard cells cell region, rows 0 to 399 201 and the user interface cells region, rows 400 to 599 202. Cursor movement within the standard cells region is limited to the boundaries of the standard cells region 201 effectively hiding the user interface cells region from view. Only by selecting a Dialog will the UI display a subset of the user interface cells and allow movement within that subset of cells. Never the less, the VP will execute all cells within the entire spreadsheet range 200 as a single matrix.

Figure 19:
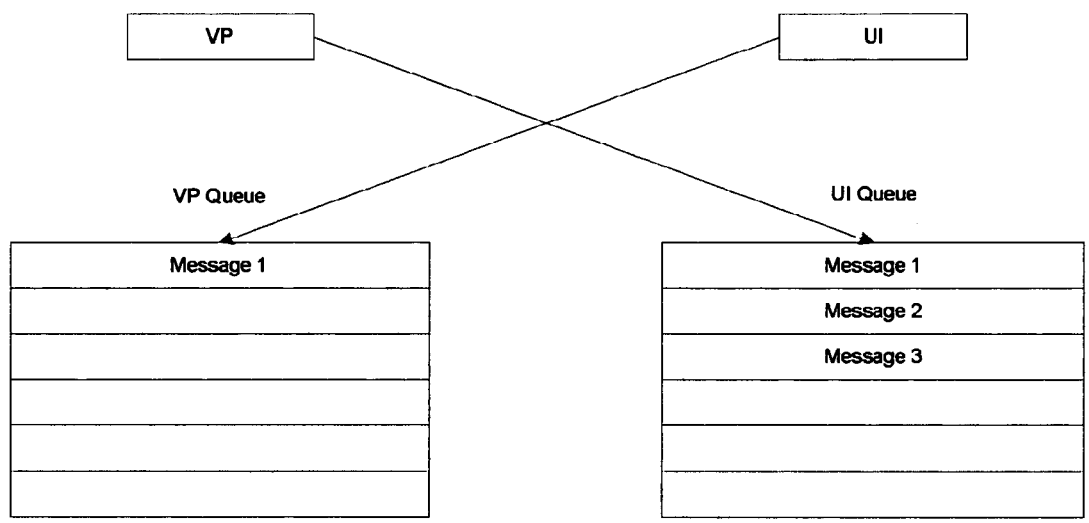
FIG. 19 shows the message passing protocol between a VP and UI.

The execution of the Dialog function, either by direct user interaction or programmatically using a Select function, begins the following sequence of events:

1. The UI sends a request to the VP for the dialog description information contained in a particular cell.
2. The VP caches the entire 20×200 user interface cell region
3. The VP sends the dialog index (0–19) and the presentation description. The description includes
   Title of the dialog
   Index of the dialog
   Height, in cells
   Width, in cells
4. From the index, the UI locates the assigned 10×20 block of cells and displays a subset of these cells based on the description information. Movement within the dialog is limited to the displayed range as defined by the Dialog function, see FIG. 6.
5. The VP interacts with the UI for dialog cells based on a message passing application protocol, as shown in FIG. 19.
6. The user selects the OK or Cancel button to close the dialog. A command is sent from the UI to the VP, which contains the chosen button:
   Cancel will cause VP to restore the dialog cell region from the cached values in step 2.
   OK will cause the VP to delete the cached values.

The Wizard function consists of a variable number of arguments, as shown in FIG. 7. The first parameter 70 is a label for display in the main spreadsheet. The second parameter 71 defines the mode, as discussed previously, in which the wizard will execute. The third to n parameters 72 are references to Dialog cells. The execution of the Wizard function begins the following sequence of events:

1. The UI sends a request to the VP for the wizard description.
2. The VP caches the entire 20×200 user interface cell region.
3. The VP sends the UI an array of dialog descriptions. The descriptions include:
   Title of the dialog
   Row of the dialog in the mainsheet
   Column of the dialog in the mainsheet For a Sequential Mode Wizard 4. The sequence follows steps 1 and then 3–5 from the Dialog sequence above.
5. Based on the array of dialogs, the UI displays a Next or Finish button, a disabled Back button, and a Cancel button
6. The user selects the Next/Finish, or Cancel button. Finish and Cancel operate like step 6 from the Dialog sequence and the Wizard function is complete.
   Selecting Next repeats steps 1 and then 3–5 from the Dialog sequence above for the next dialog in the dialog description array.
7. The UI enables the Back button.
8. The process repeats with the UI requesting dialog information for the next or back dialog in the dialog description array until either the Finish or Cancel button is pressed, at which time step 6 from the Dialog sequence happens with Finish being equivalent to OK.

For a Menu Mode Wizard

4. The UI presents the list of dialog titles in a single selection listbox
5. A dialog is selected, and the UI converts from the text label to an index value of the dialog description array. The sequence then follows steps 1 and then 3–5 from the Dialog sequence above.
6. The UI sets the text of the buttons on the dialog to Menu, OK, and Cancel.
7. Selecting Menu returns to step 4 of Menu Mode
8. Selecting OK or Cancel follows step 6 from the Dialog sequence Other modifications and implementations will occur to those skilled in the art without departing from the spirit and the scope of the invention as claimed. Accordingly, the above description is not intended to limit the invention except as indicated in the following claims.

What is claimed is:

1. A method for creating a user interface for a spreadsheet-based software application, the method comprising:
    providing a spreadsheet having:
        a standard cell region including a plurality of standard cells displayable and accessible as standard spreadsheet cells, and
        a user interface cell region, distinct from the standard cell region in that display characteristics of the user interface cell region are independent of display characteristics of the standard cell region, the user interface cell region including a plurality of effectively hidden user interface cells that are not displayable and accessible like standard cells, instead being reserved for display and access only by a dialog control function, each user interface cell being displayable only within a window superimposed upon the standard spreadsheet cells; and
    providing at least one dialog control function adapted to provide access to, and cursor movement within, an assigned subset of the plurality of user interface cells, and adapted to create the window superimposed upon the standard spreadsheet cells.

2. The method of claim 1, wherein the at least one dialog control function is executed as a function in a standard spreadsheet cell.

3. The method of claim 1, wherein the user interface cells are executed by the same processor that executes the standard cells.

4. The method of claim 1, wherein the window superimposed upon the standard spreadsheet cells is opaque with respect to the standard spreadsheet cells, such that the standard spreadsheet cells cannot be seen where ever the standard spreadsheet cells are covered by the window.

5. The method of claim 1, wherein the window superimposed upon the standard spreadsheet cells completely covers the standard spreadsheet cells so as to hide substantially all previously visible features of the standard spreadsheet cells.

6. The method of claim 1, further comprising:
    providing at least one wizard function adapted to manage a plurality of dialog control functions.

7. The method of claim 6, wherein the at least one wizard function presents the plurality of dialog control functions as a menu wherein each dialog control function can be independently accessed by a user.

8. The method of claim 6, wherein the wizard executes the plurality of dialog control functions in a sequence.

9. The method of claim 8, wherein the sequence and functionality of the plurality of dialog control functions are responsive to user input.

10. A method for creating a user interface for a software application, the method comprising:
    providing a spreadsheet having a user interface cell region that is distinct from a standard cell region in that display characteristics of the user interface cell region are independent of display characteristics of the standard cell region, the user interface cell region including a plurality of effectively hidden user interface cells that are not displayable and accessible like standard cells, instead being reserved for display and access only by a dialog control function, each user interface cell being displayable only within a window superimposed upon the software application; and
    providing at least one dialog control function adapted to provide access to, and cursor movement within, an assigned subset of the plurality of user interface cells, and adapted to create the window superimposed upon the software application.

11. A user interface for a spreadsheet-based software application, the application including a spreadsheet having a standard cell region having a plurality of standard cells displayable and accessible as standard spreadsheet cells, the user interface comprising:
    a user interface cell region, distinct from the standard cell region in that display characteristics of the user interface cell region are independent of display characteristics of the standard cell region, the user interface cell region having a plurality of effectively hidden user interface cells that are not displayable and accessible like standard cells, instead being reserved for display and access only by a dialog control function, each user interface cell being displayable only as a window superimposed upon the standard spreadsheet cells; and
    at least one dialog control function adapted to provide access to, and cursor movement within, an assigned subset of the plurality of user interface cells, and adapted to create the window superimposed upon the standard spreadsheet cells.

12. A spreadsheet comprising:
    a standard cell region having a plurality of standard cells displayable and accessible as standard spreadsheet cells;
    a user interface cell region, distinct from the standard cell region in that display characteristics of the user interface cell region are independent of display characteristics of the standard cell region, the user interface cell region having a plurality of effectively hidden user interface cells that are not displayable and accessible like standard cells, instead being reserved for display and access only by a dialog control function, each user interface cell being displayable only a& within a window superimposed upon the standard spreadsheet cells; and
    at least one dialog control function adapted to create the window superimposed upon the standard spreadsheet cells.

13. A computer system comprising:
    a spreadsheet having a standard cell region including a plurality of standard cells displayable and accessible as standard cells, and a user interface cell region, distinct from the standard cell region in that display characteristics of the user interface cell region are independent of display characteristics of the standard cell region, the user interface cell region including a plurality of effectively hidden user interface cells that are not displayable and accessible like standard cells, instead being reserved for display and access only by a control function;

an application processor for processing both the plurality of standard cells, and the plurality of user interface cells;

a user interface processor, cooperative with the application processor, for displaying the plurality of standard cells and user interface cells; and at least one control function adapted to create at least a portion of a user interface for the spreadsheet, the control function being executable by the application processor.

14. The computer system of claim 13, wherein the at least one control function is a dialog function.

15. The computer system of claim 13, wherein the at least one control function is a custom view function.

\* \* \* \* \*

UNITED STATES PATENT AND TRADEMARK OFFICE
CERTIFICATE OF CORRECTION

| | | |
|---|---|---|
| PATENT NO. | : 7,107,519 B1 | Page 1 of 1 |
| APPLICATION NO. | : 09/932119 | |
| DATED | : September 12, 2006 | |
| INVENTOR(S) | : Steven Webster et al. | |

It is certified that error appears in the above-identified patent and that said Letters Patent is hereby corrected as shown below:

Title page, item [73] Assignee: Currently reads "Cognax Corporation" should read --Cognex Corporation--

Signed and Sealed this

Ninth Day of January, 2007

JON W. DUDAS
*Director of the United States Patent and Trademark Office*